March 22, 1949.  R. B. FINLEY  2,464,856
ADJUSTABLE STEERING WHEEL
Filed March 15, 1946
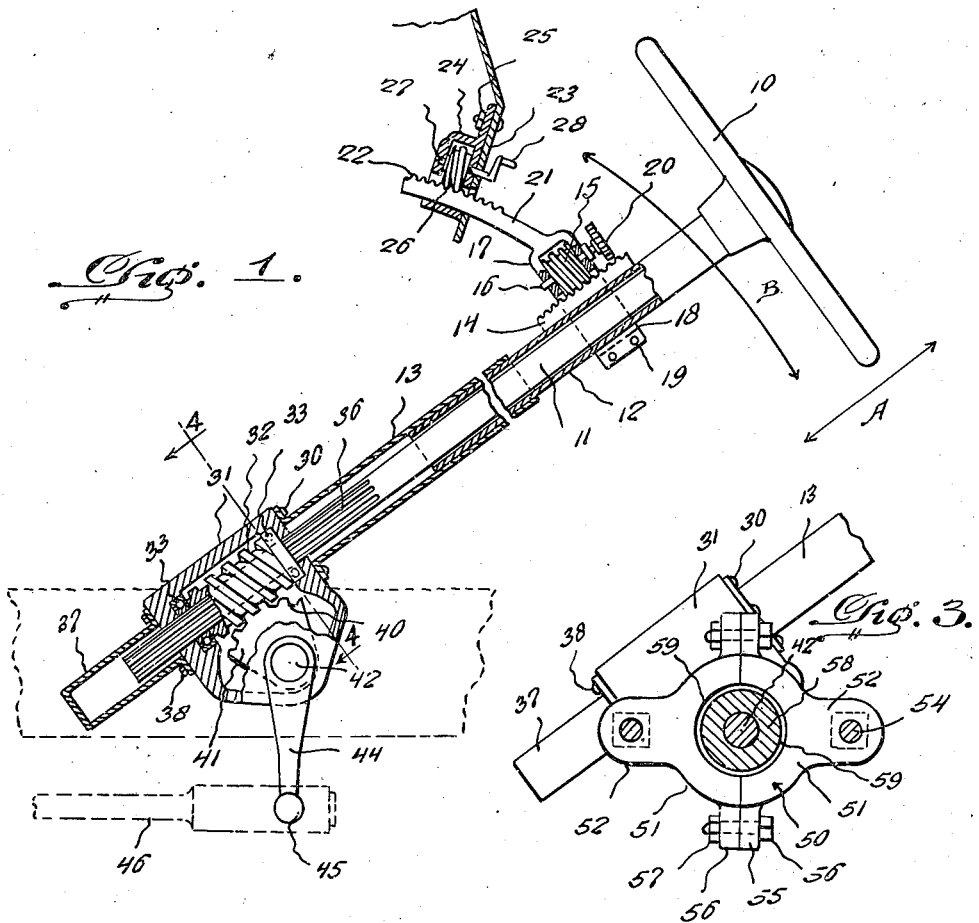
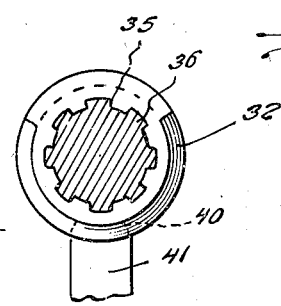
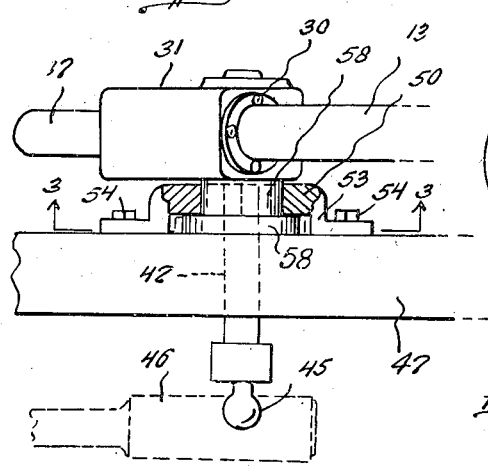
Inventor
Robert B. Finley,
By
Attorneys Patented Mar. 22, 1949

2,464,856

UNITED STATES PATENT OFFICE 2,464,856

ADJUSTABLE STEERING WHEEL

Robert B. Finley, Healdton, Okla.

Application March 15, 1946, Serial No. 654,741

10 Claims. (Cl. 74—493)

This invention relates to a steering wheel, and more particularly to a steering wheel for vehicles, such as automobiles, trucks and the like.

A primary object of this invention is the provision of an adjustable steering wheel provided with means whereby the relative length of the steering post may be varied, as well as means whereby the angular relationship of the steering post to the floor board, and correspondingly to the driver of the vehicle, may also be varied.

An additional object of the invention is the provision of such a construction whereby the steering wheel may be readily adjusted to provide the most efficient and comfortable spacing thereof with respect to the driver relative to the individual physique of the driver of the particular vehicle to which the device is applied.

Still another object of the invention is the provision of such a device which may be readily adjusted with a minimum of effort, time and difficulty.

A still further object of the invention is the provision of such a device which is sturdy and durable in construction, reliable and efficient in operation, and relatively simple and inexpensive to manufacture, assemble and install.

Other objects will in part be obvious, and in part be pointed out as the description of the invention proceeds, and shown in the accompanying drawings, wherein there is disclosed a preferred embodiment of this inventive concept.

In the drawings:

Figure 1 is a schematic view, partially in longitudinal section, and partially in elevation, certain portions thereof being broken away, showing the assembly of the steering mechanism of the instant invention with portions of a motor vehicle.

Figure 2 is a fragmentary top view, partially in elevation, and partially in section, disclosing details of the assembly of a portion of the device.

Figure 3 is a sectional view taken substantially along the line 3—3 of Figure 2, as viewed in the direction indicated by the arrows.

Figure 4 is an enlarged transverse section with parts omitted and parts broken away, taken substantially on the plane of the line 4—4 of Figure 1.

Similar reference characters refer to similar parts throughout the several views of the drawings.

Having reference now to the drawings, and more particularly to Figure 1, there is indicated at 10 a vehicle steering wheel secured, in any desired conventional manner, to a steering post or shaft 11. The shaft 11 is mounted for rotation in a tubular sleeve-like member 12 adapted to engage telescopically and slidably in a second tubular member 13.

Suitably secured in any desired manner to the sleeve 12 at an intermediate portion thereof is a rack 14 engageable with a worm gear 15 journaled for rotation, as on an axle 16, carried by a supporting bracket 17 secured in any desired manner, as by extensions 18 and bolts 19 in slidable relation with the sleeve 12. The clamping extensions 18 are of sufficient extent to permit relative linear movement of the sleeve 12 within the extensions 18 when the rack 14 is engaged by the worm 15. One end of the axle 16 carries a knurled knob or wheel 20, by means of which the worm gear 15 may be rotated, and correspondingly the rack 14 moved to move the sleeve 12 and its associated wheel 10 and shaft 11 linearly with respect to the sleeve 13. The direction of such movement is indicated by the arrow A in Figure 1.

Arcuate movement of the steering shaft 11 and its associated sleeves 12 and 13 about a pivot point to be more fully described hereinafter is provided by an arcuate extending member 21 which may be secured to, or comprise an integral part of the supporting brackets 17. The member 21 is provided with a rack 22, and extends through a suitable aperture in the instrument panel 23 of the vehicle. A worm gear housing 24 is secured in any desired manner, as by bolts 25 or the like, to the inner surface of the instrument panel 23, and has positioned therein a worm gear 26 engageable with the rack teeth 22 and mounted for rotation on a shaft or axle 27. The extremity of the axle 27 extends forwardly through the instrument panel 23, and terminates in a crank arm 28.

It will thus be seen that rotation of the crank arm 28 through rotation of the worm gear 26 serves, through the rack teeth 22, to move the arcuate segment 21 in such manner as to provide relative rotative movement in the direction indicated by the arrow B in Figure 1.

Referring back now to the sleeve 13, it will be seen that the same is secured in any desired manner, as by bolts 30, to a gear housing 31, within which is rotatably mounted a worm gear 32, suitably journaled for rotation in bearings 33 mounted within the gear box. As best shown in Figure 4, worm gear 32 is provided with a central bore, the sides of which are cut away to provide channels 35 engageable by a plurality of splines 36 cut into the lower extremity of the steering shaft 11. As best shown in Figure 1, a closed extending end cap 37 is provided in opposite alignment with the sleeve 13 and secured to the gear housing 31, as by means of bolts 38, to permit relative linear movement of the shaft 11 relative to the worm gear 32. Thus, it will be seen that linear movement of the shaft 11 and its associated sleeve 12, as effected by rotation of the knob 20 and hence the worm gear 15, is permitted by the spline and groove connection just above described without affecting the ability of the shaft 11 to turn the worm gear 32 for the purpose of steering the vehicle.

The worm gear 30 is adapted to be engaged by the teeth 40 of a gear sector or segment 41 secured to a transversely extending shaft 42, the arrangement being such that rotation of the worm gear 32 by the steering wheel 10 effects, through the gear sector 41, a corresponding rotation of the shaft 42. The shaft 42 has secured to an extremity thereof a depending arm 44 terminating in a ball joint 45 offset therefrom, as best shown in Figure 2, which ball joint engages a socket in the extremity of the steering rod 46 of the vehicle. The rod 46 is connected in any desired conventional manner to the steering knuckles of the vehicle for controlling the steering of the front wheels thereof.

Referring back now to the shaft 42 and the mounting therefor, it will be seen that the shaft 42 passes through a suitable bore extending transversely of one of the main frame members 47 of the vehicle. The mechanism is held in alignment by a split ring 50 comprising two substantially identical but opposite segments 51, each of which is provided with an extending lug 52 offset, as at 53 (see Fig. 2), and secured, as by bolts 54, to the frame member 17.

Each of the segments 51 is also provided with a vertically extending lug 55, the lugs of the opposed members aligned, and provided with aligned bores through which extend bolts 56 secured in position, as by nuts 57, thus holding the split ring assembly 50 securely in related assembly about the shaft 42. It may be here pointed out that the shaft 42 is provided with a collar 58 adapted to seat in the recess of circular configuration formed by the oppositely disposed cut-away semi-circular portion 59 comprising portions of the split ring 50.

It will now be seen that the shaft 42 serves as a pivot point for the entire steering shaft and its related sleeves when the assembly is moved by rotation of the crank 28 and corresponding rotation of the worm gear 26.

Now, from the foregoing, it will be seen that there is herein provided an improved adjustable steering wheel which may be adjusted in an arcuate path relative to the plane of the vehicle frame and also may be adjusted linearly to vary the relative length of the steering column.

It will also be seen that there is herein provided a device which accomplishes all the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative and not in a limiting sense.

I claim:

1. In a device of the character described, in combination, a vehicle, a frame therefor; a steering post assembly pivotally mounted on said frame, said assembly comprising a steering shaft, a sleeve surrounding said shaft, a second sleeve telescopically surrounding said shaft and said first-mentioned sleeve, a worm gear slidably mounted on said shaft adjacent an extremity thereof, means precluding rotation of said worm gear with respect to said shaft but permitting rotation therewith, steering means connected to said worm gear, and means for moving said shaft and said first-mentioned sleeve linearly with respect to said second-mentioned sleeve and said worm gear, said last-mentioned means including a rack carried by said first-mentioned sleeve and a second worm gear associated with said rack, means mounting said last-named worm gear on said frame, and means for rotating said last-mentioned worm gear.

2. In a device of the character described, in combination, a vehicle, a frame therefor, a steering post assembly pivotally mounted on said frame, said assembly comprising a steering shaft, a sleeve surrounding said shaft, a second sleeve telescopically surrounding said shaft and said first-mentioned sleeve, a worm gear slidably mounted on said shaft adjacent an extremity thereof, means precluding rotation of said worm gear with respect to said shaft but permitting rotation therewith, steering means connected to said worm gear, means for moving said shaft and said first-mentioned sleeve linearly with respect to said second-mentioned sleeve and said worm gear, said last-mentioned means including a rack carried by said first-mentioned sleeve and a second worm gear associated with said rack, means mounting said last-named worm gear on said frame, means for rotating said last-mentioned worm gear, and means for varying the angular relation of said assembly with respect to said frame.

3. In a device of the character described, in combination, a vehicle, a frame therefor, a steering post assembly pivotally mounted on said frame, said assembly comprising a steering shaft, a sleeve surrounding said shaft, a second sleeve telescopically surrounding said shaft and said first-mentioned sleeve, a worm gear slidably mounted on said shaft adjacent an extremity thereof, means precluding rotation of said worm gear with respect to said shaft but permitting rotation therewith, steering means connected to said worm gear, means for moving said shaft and said first-mentioned sleeve linearly with respect to said second-mentioned sleeve and said worm gear, means for varying the angular relation of said assembly with respect to said frame, said last-mentioned means including an arcuate rack extending from said assembly, a rotatable worm gear engaging said arcuate rack and means mounting said last-named worm gear on said frame.

4. In a device of the character described, in combination, a vehicle, a frame therefor, a steering post assembly pivotally mounted on said frame, said assembly comprising a steering shaft, a sleeve surrounding said shaft, a second sleeve telescopically surrounding said shaft and said first-mentioned sleeve, a worm gear slidably mounted on said shaft adjacent an extremity thereof, means precluding rotation of said worm gear with respect to said shaft but permitting rotation therewith, steering means connected to said worm gear, means for moving said shaft and said first-mentioned sleeve linearly with respect to said second-mentioned sleeve and said worm gear, means mounting said last-named means and operative to vary the angular relation of said assembly with respect to said frame, said last-mentioned means including an arcuate rack extending from said assembly, and a rotatable worm gear engaging said arcuate rack, said worm gear being mounted on the instrument panel of said vehicle.

5. In a device of the character described, in combination, a vehicle, a frame therefor, a steering post assembly pivotally mounted on said frame, said assembly comprising a steering shaft, a sleeve surrounding said shaft, a second sleeve telescopically surrounding said shaft and said first-mentioned sleeve, a worm gear slidably mounted on said shaft adjacent an extremity thereof, means precluding rotation of said worm gear with respect to said shaft but permitting rotation therewith, steering means connected to said worm gear, means for moving said shaft and said first-mentioned sleeve linearly with respect to said second-mentioned sleeve and said worm gear, means mounting said last-named means and operative to vary the angular relation of said assembly with respect to said frame, said last-mentioned means including an arcuate rack extending from said assembly, and a rotatable worm gear engaging said arcuate rack, said worm gear being mounted in the inner side of the instrument panel of said vehicle, and means extending exteriorly of said instrument panel for rotating said last-mentioned worm gear.

6. In a device of the character described, in combination, a vehicle, a frame therefor, a steering post assembly, said assembly including a steering shaft, a steering wheel on said shaft and means connecting said shaft to said frame for permitting both linear and angular adjustment of said shaft, gear and rack means carried by said frame and connected to said shaft for adjusting said shaft angularly, and means mounted on said last-named means and connected to said shaft for adjusting the latter linearly.

7. In a device of the character described, in combination, a vehicle, a frame therefor, a steering post assembly, said assembly including a steering shaft, a steering wheel on said shaft and means connecting said shaft to said frame for permitting both linear and angular adjustment of said shaft, gear and rack means carried by said frame and connected to said shaft for adjusting said shaft angularly, and a second gear and rack means mounted on said first-named rack means and connected to said shaft for adjusting the latter linearly.

8. In a device of the character described, in combination, a vehicle, a frame therefor, a steering post assembly, said assembly including a steering shaft, a steering wheel on said shaft and means connecting said shaft to said frame for permitting both linear and angular adjustment of said shaft, gear and rack means carried by said frame and connected to said shaft for adjusting said shaft angularly, a worm gear carried by said rack means, a second rack carried by said shaft and in mesh with said worm gear for adjusting said shaft linearly upon rotation of said worm gear, and means for rotating both of said gears.

9. In a device of the character described, in combination, a vehicle, a frame therefor, a steering post assembly, said assembly including a steering shaft, a steering wheel on said shaft and means connecting said shaft to said frame for permitting both linear and angular adjustment of said shaft, gear and rack means carried by said frame and connected to said shaft for adjusting said shaft angularly and comprising a worm gear carried by said frame, an arcuate rack in mesh with said gear and movable linearly upon rotation of said gear, means connecting said rack to said shaft for adjusting said shaft angularly, and means mounted on said rack and connected to said shaft for adjusting said shaft linearly.

10. In a device of the character described, in combination, a vehicle, a frame therefor, a steering post assembly including a steering shaft, a steering wheel on said shaft and means connecting said shaft to said frame for permitting both linear and angular adjustment of said shaft, worm gear and rack means carried by said frame and connected to said shaft for adjusting said shaft angularly, a second worm gear carried by said rack, a second rack carried by said shaft in mesh with said second gear and movable linearly with said shaft upon rotation of said second gear, and separate means for rotating both of said gears.

ROBERT B. FINLEY.

REFERENCES CITED

The following references are of record in the file of this patent:

UNITED STATES PATENTS

| Number | Name | Date |
|---|---|---|
| 1,367,695 | Gray | Feb. 8, 1921 |
| 1,841,294 | Nicholson | Jan. 12, 1932 |
| 2,185,779 | Tveidt | Jan. 2, 1940 |
| 2,226,656 | Best | Dec. 31, 1940 |

FOREIGN PATENTS

| Number | Country | Date |
|---|---|---|
| 435 | Great Britain | 1903 |